(12) United States Patent
Puchtler et al.

(10) Patent No.: US 6,943,519 B2
(45) Date of Patent: Sep. 13, 2005

(54) METHOD AND DEVICE FOR WEIGHT COMPENSATION IN A MECHANISM WITH CLOSED KINEMATIC CHAINS

(75) Inventors: Thomas Puchtler, Adelsdorf (DE); Dirk Staimer, Aachen (DE)

(73) Assignee: Siemens Aktiengesellschaft, München (DE)

( * ) Notice: Subject to any disclaimer, the term of this patent is extended or adjusted under 35 U.S.C. 154(b) by 270 days.

(21) Appl. No.: 10/257,342

(22) PCT Filed: Apr. 6, 2001

(86) PCT No.: PCT/DE01/01370

§ 371 (c)(1),
(2), (4) Date: Nov. 21, 2002

(87) PCT Pub. No.: WO01/76829

PCT Pub. Date: Oct. 18, 2001

(65) Prior Publication Data

US 2003/0180087 A1 Sep. 25, 2003

(30) Foreign Application Priority Data

Apr. 11, 2000 (DE) .......................................... 100 17 926
Jul. 7, 2000 (DE) .......................................... 100 33 074

(51) Int. Cl.⁷ ............................................. G05B 19/10
(52) U.S. Cl. ...................... 318/567; 318/560; 318/566; 318/568.11; 318/600; 700/262; 400/234; 901/28; 901/29
(58) Field of Search .................. 318/560, 566, 318/567, 568.11, 600, 162; 700/262, 56, 57; 901/28, 29; 408/234

(56) References Cited

U.S. PATENT DOCUMENTS

| | | | | |
|---|---|---|---|---|
| 5,179,525 A | * | 1/1993 | Griffis et al. | .................. 703/1 |
| 5,469,531 A | | 11/1995 | Faure et al. | .................. 395/86 |
| 5,715,729 A | | 2/1998 | Toyama et al. | .......... 74/490.03 |
| 6,223,604 B1 | * | 5/2001 | Fronczak et al. | ............. 73/856 |

FOREIGN PATENT DOCUMENTS

| | | | |
|---|---|---|---|
| DE | 694 02 444 T2 | 11/1997 | |
| DE | 196 36 102 A1 | 3/1998 | |
| FR | 27 57 095 A | 6/1998 | |
| JP | 407276273 * | 2/1996 | .............. B25J/9/10 |
| WO | WO 99 28-95 | 6/1999 | |
| WO | WO 99/55497 A1 | 11/1999 | |

OTHER PUBLICATIONS

"On the Accuracy of a Stewart Platform"—Part II Kinematic Calibration and Compensation, Proceedings of the IEEE International Conference on Robotics and Automation, Oren Masory, Jian Wang and Hanqi Zhuang, May 2–6, 1993, vol. 1, pp. 725–731.
Lin et al.: "Passive and active error compensation of multi–axis machines", vol. 2, pp. 1105–1116, Feb. 13, 1995.
Li et al.: "Modeling, simulation, and control of a hyfraulic Stewart platform", In: IEEE, Int. Conference Apr. 1997, vol. 4, pp. 3360–3366.
Hudgens et al.: "A new prototype parallel manipulator: Kinematics and sensor calibration", In: IEEE, Int. Conference, Jul. 26, 1993, vol. 1, p. 194–200.
Colombi et al>: "Compllance compensation in mechatronic systems", In: IEEE, Sep. 5, 1994, vol. 2, p. 9446–9451.
Zhuang: "Self–Calibration of parallel mechanisms with a case study on Stewart platforms", In: IEEE, Jun. 1997, vol. 13, No. 3, pp. 387–397.
Maurine et al.: "Calibration procedure for the parallel robot Delta 4", In: IEEE, Apr. 22, 1996, vol. 2, pp. 975–980.

* cited by examiner

*Primary Examiner*—Rita Leykin
(74) *Attorney, Agent, or Firm*—Henry M. Feiereisen

(57) ABSTRACT

The aim of the invention is to compensate for the position-dependent length changes caused by the effect of weight in a variety of closed kinematic chains (K1 . . . Kn), for connecting a stationary first element (E1) to a movable second element (E2). Said aim is achieved, by using a back transformation ($\Lambda^{-1}$), which determines a compensation value for each length change (dq1, dq2 . . . dqn), resulting from the application of the weight (Fg) impinging on the movable element (E2) in each kinematic chain.

7 Claims, 2 Drawing Sheets

METHOD AND DEVICE FOR WEIGHT COMPENSATION IN A MECHANISM WITH CLOSED KINEMATIC CHAINS

BACKGROUND OF THE INVENTION

The present invention relates to a method and a device for compensating for position-dependent length changes caused by the effect of weight in a plurality of closed kinematic chains for connecting a stationary first element to a movable second element, on which a weight acts, respective actuators being assigned to the kinematic chains, via which a relative movement between the first and the second element is predefined in a freely definable sequence of control instructions, by the respective positions of the respective actuators required for desired positions of the movable element being determined via a back transformation $\Lambda^{-1}$, in particular for parallel kinematic systems for use in numerically controlled machine tools and robots.

Such aforementioned parallel kinematic systems are being employed to an increasing extent in machine tools and industrial robots. In this case, a parallel kinematic system constitutes a three-dimensional coupling mechanism which comprises at least one closed kinematic chain. The kinematic chain, for its part, is used to connect a fixed frame platform to a movable working platform. Kinematic chains in this case comprise either links and connecting elements of constant or variable length. In the illustrations according to FIGS. 2 and 3, two different embodiments of parallel kinematic systems according to the prior art are shown, which are used in machine tools and robots. Here, FIG. 2 shows a parallel kinematic system with invariable-length connecting elements, while FIG. 3 shows one such with variable-length connecting elements, which are in each case driven by associated actuators. Shown in each case is a frame platform P1, which is connected to a movable working platform P2 via links G1 ... Gn and connecting elements V1 ... Vn. In each case a weight Fg acts on the working platform P2, which represents an inertial mass.

As compared with conventional machine tools and serial robots, parallel kinematics are distinguished by their high dynamics and stiffness. The advantage of parallel kinematic systems consists inter alia in the fact that forces act predominantly axially on the movable connecting elements. Nevertheless, even in parallel kinematic systems, the problem arises that the connecting elements and links change their length as a result of the effect of weight or processing forces, which leads to positioning errors of the working point (working platform P2).

These length changes of the kinematic chains lead to position errors of the working point and impair the production quality. In the case of conventional machine tools, this leads to a positioning accuracy of about 10 $\mu$m. The aforementioned length changes are of approximately the same order of magnitude.

In the case of conventional machines with mutually perpendicular actuators, linear axes as they are known, the length changes caused by a constant weight are taken into account axis by axis in the form of a measured correction table and are compensated for in this way. Hitherto, however, there has been no remedy for the problem outlined in parallel kinematic systems and in general in closed kinematic chains for connecting a stationary first element to a movable second element, on which a weight acts.

It is therefore an object of the present invention to permit compensation of the position-dependent length change caused by the effect of weight in kinematic chains.

SUMMARY OF THE INVENTION

According to the present invention, this object is achieved in that the known method cited at the beginning is developed by the following method steps according to the invention, in that by using the transformation rules, the weight acting on the movable element is distributed to the respective kinematic chains and in this way the forces caused therein are determined, in accordance with the respective compliance of the kinematic chains, the resultant respective length changes are determined and the respective actuators are acted on with a respective compensation value which compensates for the respective length change determined.

According to a first advantageous refinement of the method of compensating for the position-dependent length changes caused by the effect of weight in a plurality of closed kinematic chains, according to the present invention the respective compensation values determined are incorporated into the sequence of control instructions for the relative movement between the first and the second element.

A further advantageous configuration of the method of compensating for the position-dependent length changes caused by the effect of weight in a plurality of closed kinematic chains according to the present invention is distinguished by the fact that each kinematic chain comprises links and connecting elements of constant length.

An alternative advantageous configuration of the method of compensating for the position-dependent length changes caused by the effect of weight in a plurality of closed kinematic chains according to the present invention is distinguished by the fact that each kinematic chain comprises links and connecting elements of variable length.

A further advantageous configuration of the method of compensating for the position-dependent length changes caused by the effect of weight in a plurality of closed kinematic chains according to the present invention is distinguished by the fact that this is used in a three-dimensional coupling mechanism, in particular in a parallel kinematic system.

Furthermore, according to the invention, the object of the invention is achieved in that a known three-dimensional coupling mechanism having a plurality of closed kinematic chains for connecting a stationary frame platform to a movable working platform, each kinematic chain being associated with at least one driven axis, for carrying out a relative movement between the stationary frame platform and the movable working platform, having a control unit which has computing means for the back transformation $\Lambda^{-1}$ of the respective positions of the respective axes required for desired positions of the movable working platform, is developed by the following device features according to the invention:

the computing means are configured in such a way that by using these transformation rules, the weight acting on the moved element can be distributed to the respective kinematic chains and in this way the forces caused therein can be determined, in accordance with a respective compliance of the kinematic chains, the resultant respective length changes can be determined and the respective axes can be acted on with a respective compensation value which compensates for the respective length change determined.

A three-dimensional coupling mechanism according to the present invention can be particularly advantageously employed in a parallel kinematic system.

A parallel kinematic system of this type according to the present invention can in particular be a kinematic chain which comprises links and connecting elements of constant length.

Another advantageous parallel kinematic system according to the present invention can in particular be a kinematic chain which comprises links and connecting elements of variable length.

Such a parallel kinematic system according to the present invention can particularly advantageously be used in a numerically controlled machine tool or a numerically controlled robot.

By means of the invention, a non-negligible influence on the positioning accuracy of parallel kinematic systems can be compensated for, for example, by the force Fg acting on the working platform as a result of the inherent weight being distributed to the kinematic chains by an algorithm sketched in more detail at a later point. Given known compliance of the kinematic chains, these length changes can be calculated and taken into account axis by axis as a compensation value, in a manner analogous to temperature compensation.

In this case, the result, as advantages of the invention, is primarily an increase in the static positioning accuracy, the fact that no additional measuring devices are needed, the fact that the method can be applied to any desired parallel kinematic system, and the fact that transformations already implemented can be used.

Further advantages and details of the present invention are given by using the presentation which now follows of preferred embodiments and in conjunction with the figures. In this case, elements with a constant functionality are identified by the same designations.

DETAILED DESCRIPTION OF PREFERRED EMBODIMENTS

Figure 2:
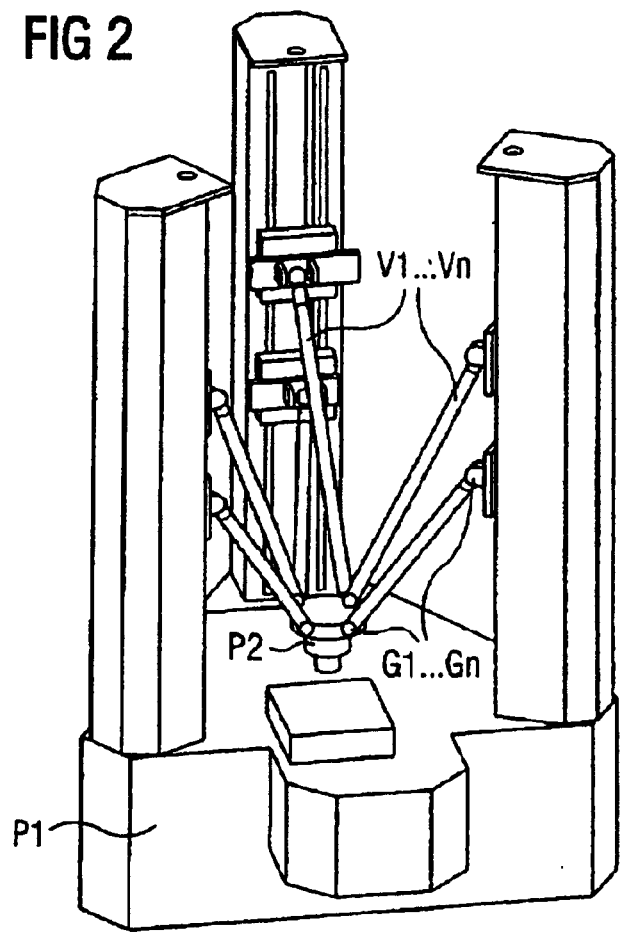
FIG. 2: shows a parallel kinematic system with invariable-length rods
Figure 3:
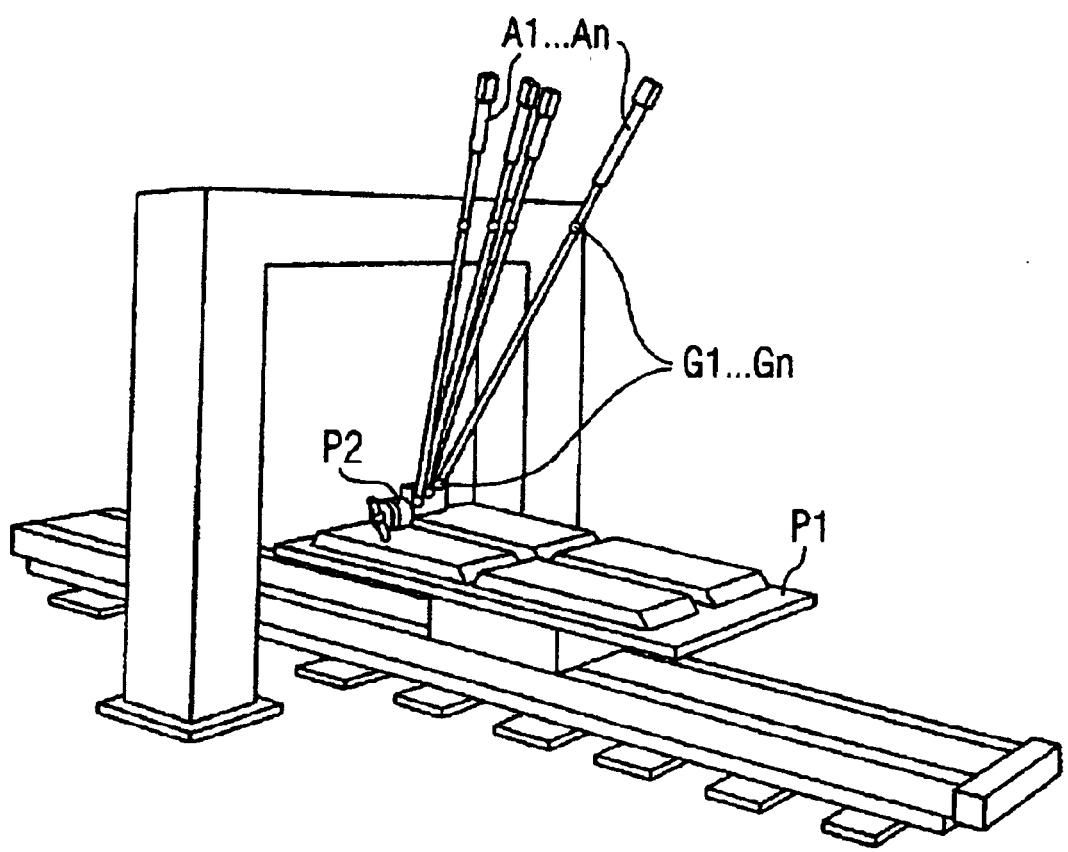
FIG. 3: shows a parallel kinematic system with variable-length connecting elements.

The illustrations according to FIGS. 2 and 3 have already been explained at the beginning, in order to present the general construction of a parallel kinematic system and the different possible constructional configurations.

Figure 1:
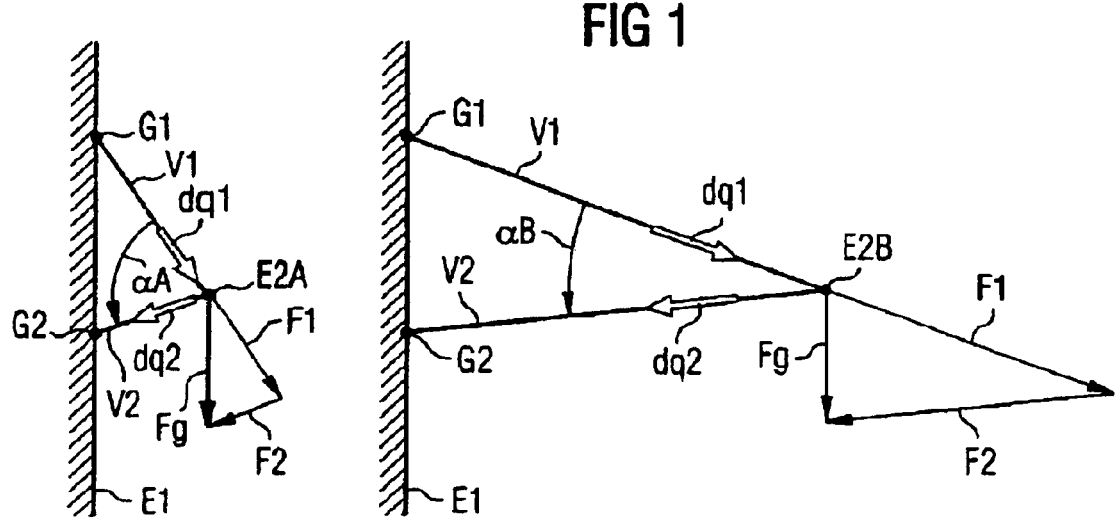
FIG. 1: shows weight and force distribution to two connecting elements at different working points.

For the purpose of illustration, FIG. 1 shows a two-axis, flat parallel kinematic system having a stationary first element E1 and a movable second element E2 in two positions $E2_A$ (left-hand figure) and $E2_B$ (right-hand figure). Here, the stationary element E1 can for example represent the frame platform P1, and the movable second element E2 can represent the working platform P2. The movable second element E2 is connected to the stationary first element E1 via two connecting elements V1, V2 and two links G1, G2 (via a kinematic chain K1 and K2 in each case). The weight Fg acts in the stationary second element E2 and is divided up into partial forces F1 and F2 onto the respective connecting elements V1 and V2. This is illustrated in the left-hand figure for a first position and in the right-hand figure for a second position.

At an obtuse angle $\alpha_A$ (left-hand figure), the forces acting on the connecting elements are low and, accordingly, result in only low loading of the connecting elements V1 and V2. At an acute angle $\alpha_B$ (right-hand figure), by contrast, very high forces act on the connecting elements V1 and V2, and can exceed the weight Fg acting at the working point by many times.

In parallel kinematic systems, the connecting elements V1, V2 are always loaded in the axial direction. In this direction, these connecting elements generally exhibit desired high stiffness caused by the construction. The resultant stiffness of the parallel kinematic systems, however, can be below this, depending on the position ($E2_A$ or $E2_B$). As a result of the respective partial forces F1, F2 acting on each connecting element V1, V2, even with a particularly high stiffness in the axial direction, there are respective length changes dq1 and dq2, which are all the greater the higher the partial forces F1 and F2 become, which is the case with an increasingly more acute angle (compare the left-hand and right-hand figures). However, these undesired length deviations dq1 and dq2 in turn result in position deviations of the element E2 from the desired ideal working point.

In order to carry out, for example, a processing task on a machine tool or an industrial robot, the relative movement of the two platforms P1 or E1 and P2 or E2 is predefined in a freely definable sequence of instructions. With the aid of a mathematical algorithm implemented in the control unit (e.g. CNC=computerized numeric control), the back transformation $\Lambda^{-1}$, as it is known, the control unit calculates the positions q of the n connecting elements V1 . . . Vn (for example driven axes A1 . . . An) needed for the desired positions x of the working platform P2 or E2 in the case of n kinematic chains K1 . . . Kn (in the exemplary embodiment, n=2). In additional mathematical algorithms implemented in the control unit, these transformation formulas $\Lambda$, $\Lambda^{-1}$ are used to distribute the weight Fg acting on the moved platform P2 or E2 to the kinematic chains K1 . . . Kn. This procedure is independent of the respective kinematic system and can therefore be used as a universal module for all parallel kinematic systems.

According to the invention, additional mathematical algorithms (which are stored for example in the software of the control unit) are now implemented in the control unit, for example a suitably programmed microcomputer. These algorithms will be presented below.

Via a forward transformation $\Lambda$ corresponding to the back transformation $\Lambda^{-1}$, the given positions q of the driven axes A1 . . . An are used to calculate the Cartesian position and possibly orientation x of the working platform P2 or E2. The back transformation $\Lambda^{-1}$ calculates the associated positions q of the driven axes A1 . . . An from x.

This results in the following basic calculation relationship:

$$\Lambda: D \subset IR^M \to IR^R, \Lambda(q)=x \text{ and } \Lambda^{-1}: E \subset IR^R \to IR^M, \Lambda^{-1}(x)=q \quad (1)$$

The first mathematical derivative of $\Lambda$ is the function known to those skilled in the art as the "Jacobian matrix". Given simple transformation relationships, it can be specified in the form of a closed formula or approximated numerically in the general case, which makes the implementation easier in suitable computing means R of a control unit for an appropriately compensated three-dimensional coupling mechanism.

The following further calculation rule applies to carrying out the transformation for all the kinematic chains K1 . . . Kn:

$$J = \frac{d\Lambda}{dq} = \begin{pmatrix} \frac{d\Lambda_1}{dq_1} & \cdots & \frac{d\Lambda_1}{dq_n} \\ \vdots & \ddots & \vdots \\ \frac{d\Lambda_n}{dq_1} & \cdots & \frac{d\Lambda_n}{dq_n} \end{pmatrix} \quad (2)$$

The weight Fg=m*g acts on the inertial mass m, which represents the working platform P2 or E2, g representing the acceleration due to gravity of 9.81. By utilizing the transformation formulas of the forward transformation Λ shown, the respective partial forces F1 ... Fn or τ1 ... τn caused in the actuators A1 ... An by the weight Fg are determined.

Here, it is true that τ=$J^T$*Fg, $J^T$ being the transposed matrix of J. The latter relationship is known to those skilled in the art and, inter alia, can be gathered from the following reference: "Roboter mit Tastsinn" [Robots with a sense of feel], Matthias Müller, Vieweg-Verlag, Braunschweig, 1993. The corresponding relevant text is to be deemed to be incorporated by reference.

Given a known compliance G of the actuators A1 ... An, the respective length changes dq1 ... dqn can be determined in accordance with the following calculation rule $$dq=G*q*\tau \quad (3)$$

and, as compensation values, can be compensated for in a manner analogous to a temperature-induced length change, for example by the respective compensation values determined being taken into account in a sequence of control instructions.

What is claimed is:

1. A method of compensating for position-dependent length changes in a plurality of closed kinematic chains that connect a stationary first element to a movable second element, with a weight acting on the second element, comprising the steps of:

assigning to the kinematic chains respective actuators which define a relative movement between the first and the second element based on a freely definable sequence of control instructions, determining corresponding positions of the respective actuators required for desired positions of the movable element via a back transformation, distributing the weight acting on the movable element over the respective kinematic chains by applying rules associated with the back transformation to thereby determine forces acting on the respective kinematic chains, determining from the forces acting on the respective kinemetic chains length changes of the kinematic chains in accordance with respective compliance values of the kinematic chains, and applying to the actuators corresponding compensation values which compensate for the respective length changes, wherein each kinematic chain comprises links and connecting elements of constant length.

2. The method of claim 1, and further including incorporating the compensation values into the sequence of control instructions.

3. The method of claim 1, wherein the plurality of closed kinematic chains represents a three-dimensional coupler mechanism.

4. The method of claim 3, wherein the three-dimensional coupler mechanism is a parallel kinematic system.

5. A three-dimensional coupling mechanism for moving a movable platform relative to a stationary platform, comprising:

a plurality of closed kinematic chains connecting the stationary platform to the movable platform, each kinematic chain comprising links and connecting elements of constant length and being associated with at least one driven axis, a control unit with computing means for performing a back transformation to determine positions of the at least one driven axis of each kinematic chain that determine desired positions of the movable platform, wherein the computing means are configured to cause the weight acting on the movable element to be distributed over the respective kinematic chains by applying rules associated with the back transformation to thereby determine forces acting on the respective kinematic chains, length changes of the kinematic chains to be determined from the forces acting on the respective kinematic chains in accordance with respective compliance values of the kinematic chains, and corresponding compensation values to be applied to the actuators, which compensate for the respective length changes.

6. A parallel kinematic system comprising the three-dimensional coupling mechanism of claim 5.

7. A numerically controlled machine tool or robot comprising the parallel kinematic system of claim 5.

* * * * *

UNITED STATES PATENT AND TRADEMARK OFFICE
CERTIFICATE OF CORRECTION

PATENT NO. : 6,943,519 B2 Page 1 of 1
APPLICATION NO. : 10/257342
DATED : September 13, 2005
INVENTOR(S) : Thomas Puchtler et al.

It is certified that error appears in the above-identified patent and that said Letters Patent is hereby corrected as shown below:

Column 6
Line 2: change "kinemetic" to --kinematic--

Signed and Sealed this

Eighteenth Day of July, 2006

JON W. DUDAS
*Director of the United States Patent and Trademark Office*